RECEIVER MEANS FOR REPRODUCING MONAURAL OR STEREO SIGNALS

Filed Dec. 21, 1962 3 Sheets-Sheet 1

INVENTOR.
MAURICE D. DEMONG
BY Moody and Phillips
ATTORNEYS

Oct. 5, 1965 M. D. DE MONG 3,210,474

RECEIVER MEANS FOR REPRODUCING MONAURAL OR STEREO SIGNALS

Filed Dec. 21, 1962 3 Sheets-Sheet 2

INVENTOR.
MAURICE D. DeMONG
BY Moody and Phillips
ATTORNEYS

Oct. 5, 1965 M. D. DE MONG 3,210,474

RECEIVER MEANS FOR REPRODUCING MONAURAL OR STEREO SIGNALS

Filed Dec. 21, 1962 3 Sheets-Sheet 3

INVENTOR.
MAURICE D. DeMONG
BY Moody and Phillips
ATTORNEYS

United States Patent Office 3,210,474

Patented Oct. 5, 1965

3,210,474

RECEIVER MEANS FOR REPRODUCING MONAURAL OR STEREO SIGNALS

Maurice D. De Mong, Tustin, Calif., assignor to Collins Radio Company, Cedar Rapids, Iowa, a corporation of Iowa Filed Dec. 21, 1962, Ser. No. 246,426
4 Claims. (Cl. 179—15)

This invention relates generally to means for electrically adapting an FM tuner to reporduce either monaural or stereo signals and, more specifically, to an FM tuner constructed to selectively reproduce either a monaural signal or a stereo signal automatically by electronic means.

Recently, there has been developed a method for transmitting either monaural signals or, alternatively, a composite signal including stereo signals and a subsidiary communication authorization (SCA) signals, the latter also being commonly known as "storecast" signals. The SCA or storecast signals are used primarily to provide music for commercial establishments, such as stores and restaurants. In generating such a composite signal a first microphone is placed on the right-hand side of the sound source, which may be an orchestra, for example, and a second microphone is placed on the left-hand side of the sound source. The two microphones generate signals to form what is defined as the R and the L audio signal with the R and L indicating the signals detected by the right- and the left-hand positioned microphones, respectively. The composite signal transmitted consists of the summation of the R and the L audio signals to produce a first signal which may be abbreviated as the $(R+L)$ signal, and occupying a frequency range of, perhaps, zero to 15 kilocycles. Such signal represents the monaural portion of the signal and can be received by a standard FM tuner.

A second portion of the composite signal includes a full double sideband signal with a suppressed carrier (the carrier signal is not transmitted). The said second signal portion contains an $(R-L)$ audio signal which is amplitude modulated upon the carrier to form the double sidebands which are transmitted. Said $(R-L)$ audio signal is equal to the signal picked up by the right-hand positioned microphone minus the signal detected by the left-hand positioned microphone. The frequency bandwidth of said second signal is, in the specific example to be used herein, from 23 kilocycles to 53 kilocycles with the suppressed carrier positioned at the 38 kilocycle point. Also present when stereo is being transmitted is a pilot signal which is located between the $(R+L)$ audio signal and the $(R-L)$ amplitude modulated double sideband signal. With the above-cited specific frequencies, such a pilot signal has a frequency of 19 kilocycles and is located exactly midway between the upper side of the monaural audio bandwidth and the lower side of the $(R-L)$ double sideband signal.

A third portion of the composite signal comprises the SCA signal, which is frequency modulated and occupies a higher bandwidth than the $(R-L)$ double sideband signal. The bandwidth of the SCA signal is from 59 kc. to 75 kc. It should be noted that in the present invention the SCA signal does not play a part and, in fact, is removed by traps as will be described later herein.

As indicated above, the $(R+L)$ audio by itself constitutes the monaural signal and may be received by any standard broadcast FM receiver. When it is desired to transmit and receive a stereo signal, however, the second signal, that is, the $(R-L)$ double sideband signal with the suppressed carrier, and the pilot signal are also transmitted, as well as the $(R+L)$ audio signal. By appropriate circuit means the $(R+L)$ audio signal is added to the $(R-L)$ amplitude modulated signal to reproduce, at the receiver, the audio signal R originally picked up by the microphone located on the right side of the sound source. Similarly, by subtracting the $(R+L)$ audio signal from the $(R-L)$ double sideband amplitude modulator signal, the audio signal L originally picked up by the microphone placed on the left-hand side of the sound source can be reproduced. Such reproduced R and L audio signals are then independently supplied to receiver speakers positioned at appropriate right- and left-hand locations, thus producing the stereo effect.

In the prior art the reception of monaural signals alone and the reception of monaural plus stereo signals are accomplished in two quite separate circuit means. When only monaural is being received, it is necessary to open (open circuit) one of these circuit means and to pass the monaural signal directly through the other circuit means. If the monaural were passed through both circuit means, distortion of the resultant signal would occur.

However, when stereo is to be received, a relay means is caused to operate, perhaps in response to the now present pilot signal, to switch the entire received signal from the first circuit means into a second circuit means entirely independent of the first circuit means. The said second circuit means contains the necessary circuit means for adding and subtracting the $(R+L)$ and the $(R-L)$ components of the received composite signal to separately reproduce the R and L signals. More specifically, the second circuit means can contain two channels for performing the adding and subtracting function. A typical prior art is disclosed in an article beginning on page 40 of the "Electronics World" of October, 1961.

Although the prior art has proved useful, it exhibits certain disadvantages in addition to not using the same circuit means for both manaural and stereo reception. More specifically, the prior art employs a relay which is relatively expensive and more subject to breakdown than electronic means. Furthermore, a relay requires greater power consumption than electronic switching means.

It would mark a definite improvement in the art to provide means for reproducing both monaural and stereo signals with the same circuit means.

A primary object of the present invention is to provide an electronic control circuit which will adapt an FM tuner to reproduce either monaural or stereo signals automatically with the same circuit.

A second object of the invention is to provide an electronic control means which automatically will reproduce either monaural or stereo signals, thus replacing the relay switching means and multicircuit means heretofore required for receiving monaural and stereo signals.

A third purpose of the invention is to provide a relatively simple and maintenance-free means for adapting an FM tuner to reproduce either monaural or stereo signals automatically.

A fourth aim is the general improvement of means capable of receiving and reproducing monaural or stereo signals automatically.

In accordance with the invention there is provided an input signal source capable of receiving the transmitted signal which either can consist only of the $(R+L)$ audio signal, or alternatively of a composite signal including the $(R+L)$ audio signal, a full double sideband signal (with suppressed carrier) containing the $(R-L)$ audio signal, and the SCA signal, which is not utilized in the present invention, and which is removed by traps. The received input signal is supplied to two output channels arranged in parallel with respect to the input signal source. Each of the output channels is comprised of a diode for detecting the applied input signal and a filter means for extracting the envelope from the detected signal. The diodes in each of the two output channels are oppositely poled with respect to the input signal, thus providing a multiplexing action in that one diode will be conductive while the other diode is nonconductive. D.-C. biasing means having an amplitude greater than the $(R+L)$ signal functions to cause a first of the diodes to remain in a nonconductive state during the time that only an $(R+L)$ audio signal is being received. When a pilot signal and a stereo signal are received in addition to the $(R+L)$ audio signal, the pilot signal is extracted therefrom and the frequency doubled so as to be equal to the frequency of the suppressed carrier of the stereo signal. Such reproduced carrier signal, which has an amplitude much larger than the aforementioned biasing means, is then supplied to the two output channels of the system where it combines with the suppressed carrier double sideband signal to produce a full double sideband amplitude modulated stereo signal containing the $(R-L)$ component. Further, the reproduced carrier signal combines with the $(R+L)$ audio signal. Since the amplitude of the reproduced carrier signal is considerably greater than the aforementioned biasing voltage, both of said diodes will now be conductive. Thus, across one diode there will be impressed, in addition to the carrier signal, the audio signals $(R+L)$ and $(R-L)$ and across the other diode, in addition to the carrier signal, audio signals $(R+L)$ and $-(R-L)$. When the two audio signals at the two diodes are added together the output from one diode will be an audio signal 2R plus the carrier and the output signal from the other diode will be audio signal 2L plus the carrier. Filtering means are provided to remove the carrier from each of the output signals of the two diodes leaving only the audio signals, which are then supplied to the right- and left-hand positioned speakers.

An important feature of the invention is the use of the same circuit means for reproducing a monaural signal as is used for reproducing a stereo signal.

The above and other objects and features of the invention will be more fully understood from the following detailed description thereof when read in conjunction with the drawings in which.

Figure 1:
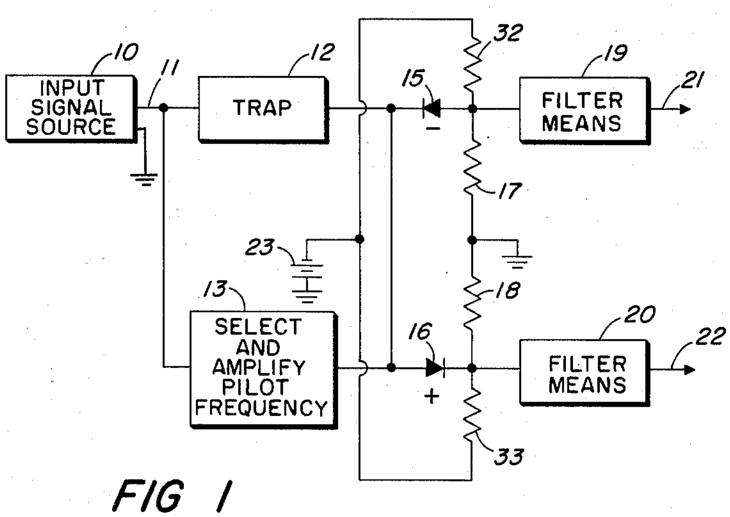
FIG. 1 shows a combination general block diagram and schematic diagram of the invention.
Figure 2:
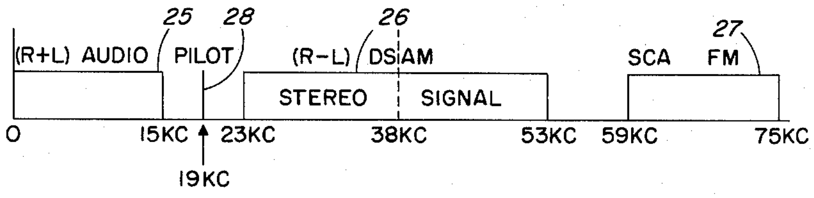
FIG. 2 shows a graph of the frequency spectrum of a composite signal.

Referring now to FIG. 1, the input source 10 which may be an FM tuner, for example, receives the transmitted stereo signal, detects it, and then supplies to its output terminal 11 a signal as represented by the frequency spectrum chart of FIG. 2. In FIG. 2, the signal can be seen to be divided into three portions 25, 26, and 27, plus a pilot signal 28. The portion 25 extends over a frequency bandwidth from zero to 15 kilocycles. Such signal is the $(R+L)$ audio signal and is an amplitude modulated signal. The portion 26, extending over a bandwidth from 23 kilocycles and to 53 kilocycles, is a full double sideband signal with a suppressed carrier, and is formed by modulating the carrier signal with the $(R-L)$ audio signal. Portion 26 is an amplitude modulated signal.

The third portion 27 of the composite signal is an FM signal covering a frequency bandwidth of 59 kilocycles to 75 kilocycles, and is the subsidiary communications authorization (SCA) signal discussed hereinbefore.

The pilot signal 28 has a frequency of 19 kilocycles which is one-half the frequency of the 38 kilocycles suppressed carrier. Further, the pilot signal 28 falls midway between the upper side of the $(R+L)$ audio bandwidth 25 and the lower side of the stereo signal 26. Thus, the pilot signal can be handled and processed separately either from the $(R+L)$ audio or the stereo signal for purposes which will be more clearly evident later herein.

As discussed briefly above, the $(R+L)$ monural signal 25 can be transmitted alone and can be received by any standard FM tuner. Alternatively, the monaural signal 25, the stereo signal 26, and the pilot signal 28 can be transmitted simultaneously for stereo reception. In describing this invention the case where monaural alone is being received will be discussed first with reference to FIG. 1. Subsequently, stereo reception will be discussed.

Figure 7:
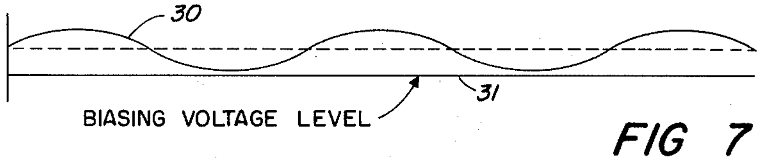
FIG. 7 shows the relative amplitudes of the monaural signal and the D.-C. biasing potential.

The monaural signal is shown by the curve 30 of FIG. 7 and has an amplitude which is less than the amplitude of the biasing voltage level 31 which is supplied by negative battery source 23 of FIG. 1. Thus the monaural signal supplied from the signal source 10 through the trap 12 cannot pass through the diode 15, which is biased into nonconductivity. Consequently, no output signal will appear on output lead terminal 21 when a monaural signal alone is being received. The monaural signal will, however, pass through diode 16 and filter means 20 to the output lead 22 from whence it will be supplied to audio amplifiers and a speaker.

In the case where stereo is being received, i.e., when the signals 25 and 26 and the pilot signal 28 of FIG. 2 are being received, the result is different. Filtering and amplifying circuit 13 is constructed to double the 19 kilocycle pilot frequency to produce a 38 kilocycle signal. Such 38 kilocycle signal is employed to replace the suppressed 38 kilocycle carrier signal. More specifically, the 38 kilocycle signal is supplied from the amplifier 13 to the diodes 15 and 16 where it is mixed with the $(R+L)$ and $(R-L)$ signals in the manner described in the following paragraphs.

Figure 4:
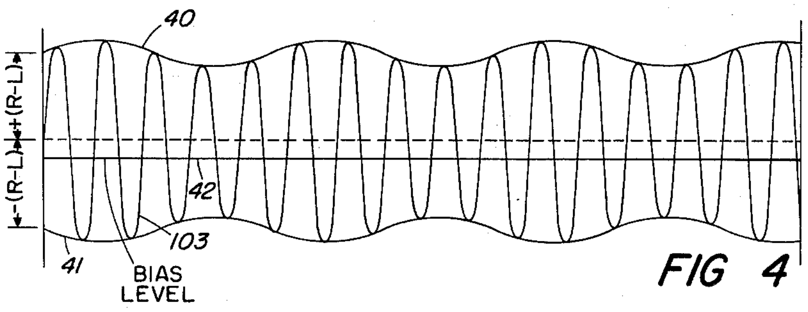
FIG. 4 is a pictorial representation of the stereo signal plus the reproduced carrier.

Reference is made to FIG. 4 wherein the waveform 103 represents the reproduced carrier signal combined with the two sidebands of the stereo signal. The upper and lower envelopes, identified by the reference characters 40 and 41, represent the audio signal. More specifically, the upper envelope 40 represents the audio signal $(R-L)$ and the lower envelope 41, which is 180° removed from the upper envelope, represents the audio signal $-(R-L)$. Since the D.-C. bias level 42 has an amplitude considerably less than the peak-to-peak amplitude of the waveform 103, the biasing function of the D.-C. biasing source 23 is eliminated.

Figure 5:
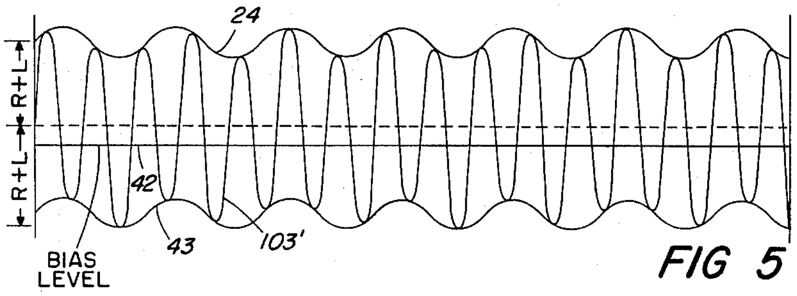
FIG. 5 is a pictorial representation of the $(R+L)$ audio signal superimposed upon the reproduced carrier signal.

In FIG. 5 there is shown the resultant signal when the reproduced 38 kilocycle carrier signal is combined with the $(R+L)$ monaural audio signal at the inputs to the diodes 15 and 16. Both the upper and lower envelopes 24 and 43 of the waveform of FIG. 5 are identical, each representing the $(R+L)$ audio signal. Further, since the peak-to-peak swing of the modulated carrier signal 103' of FIG. 5 is much greater than the D.-C. biasing level 42', no biasing function is performed.

In the waveforms of both FIGS. 4 and 5 the positive excursions of the carrier signal, that is, the portion of the carrier signal on the positive side of the biasing potential level 42, will pass through the diode 16 of FIG. 1 to filter 20, and those portions of the carrier signal falling on the negative side of the biasing level 42 of FIGS. 4 and 5, will pass through diode 15 to filter 19. The upper envelopes 40 and 42 of FIGS. 4 and 5 appear in combined form at the output of filter 20 and the lower envelopes 41 and 43 of FIGS. 4 and 5 appear in combined form at the output of filter 19. More specifically, at the output of filter 20 the audio waveform $(R-L)$ from FIG. 4 and the audio waveform $(R+L)$ from FIG. 5 combine to produce an audio output signal of amplitude 2R on output terminal 22. Similarly, audio waveform signal $(R-L)$ from FIG. 4 and audio waveform $(R+L)$ from FIG. 5 combine to produce on audio output signal of amplitude 2L on the output terminal 21. Thus, the original signals supplied to the right-hand positioned and the left-hand positioned microphones at the transmitter source are reproduced on terminals 22 and 21, respectively. Filters 19 and 20 remove the carrier signal 103, leaving only the envelopes.

Figure 6:
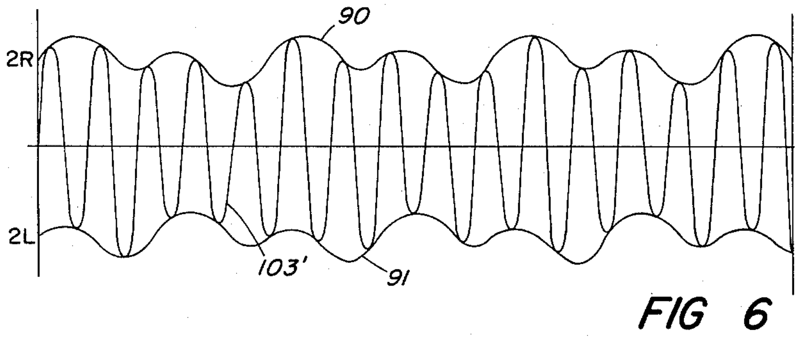
FIG. 6 shows the resultant waveform when the curves of FIG. 4 and FIG. 5 are combined.

In FIG. 6 there is shown the resultant waveforms created by the addition of the waveforms of FIGS. 4 and 5. The upper envelope 90 of FIG. 6 represents the sum of the upper envelopes 40 and 24 of FIGS. 4 and 5, respectively, and is equal to $(R+L)+(R-L)=2R$. The lower envelope 91 of FIG. 6 represents the sum of the lower envelopes 41 and 43 of FIGS. 4 and 5, respectively, and is equal to $(R+L)-(R-L)=2L$.

Figure 3:
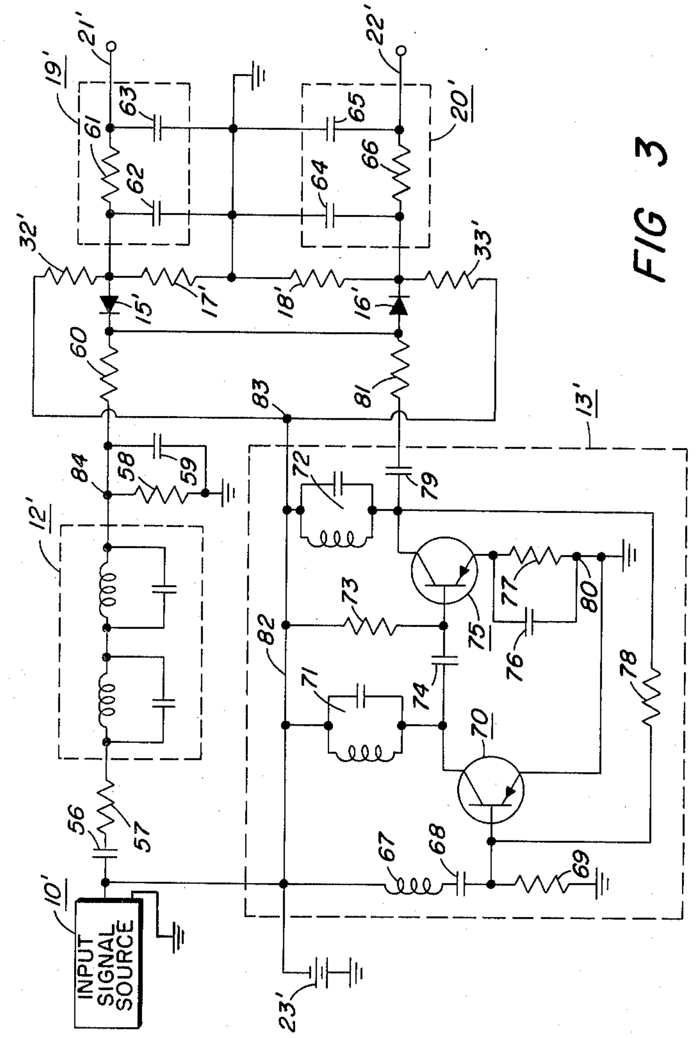
FIG. 3 is a schematic diagram of the invention.

Referring to FIG. 3, there is shown a schematic diagram of the invention, which corresponds to the block diagram of FIG. 1. In FIG. 3 the blocks 10′, 12′, 13′, 19′, and 20′ correspond to blocks of FIG. 1 having corresponding reference characters, unprimed. Similarly, diodes 15′ and 16′ and resistors 32′, 17′, 18′, and 33′, and the battery source 23′ of FIG. 3 corresponds to components having the same reference characters, unprimed, in FIG. 1. Outputs 21′ and 22′ correspond to the similarly marked outputs of FIG. 1.

In the operation of the circuit of FIG. 3, the input signal of source 10′ is supplied to trap 12′ through coupling capacitor 56. Resistors 57 and 58 form a voltage divider having a tap 84 which is connected to the input of diodes 15′ and 16′ through resistor 60. Capacitor 59 is an R–F bypass capacitor. As indicated above, the trap 12′ blocks the SCA signal 27 of FIG. 2.

Negative battery source 23′ is connected through lead 82 to terminal 83, and then through resistors 32′ and 33′ to the anode and the cathode, respectively, of diodes 15′ and 16′; thus biasing the diode 15′ into nonconductivity in the presence of monaural signals. Battery source 23′ also functions as the collector voltage source for transistors 70 and 75 through collector tuned circuits 71 and 72, respectively.

The series tuned circuit comprised of inductor 67 and capacitor 68 is tuned to the frequency of the pilot signal and presents a low impedance to said pilot frequency when stereo is being received. Thus, the pilot signal 28 of FIG. 2 will appear across resistor 69 of FIG. 3 and will be supplied to the base of amplifying transistor 70. Tuned collector circuit 71, however, is tuned to the second harmonic of the 19 kilocycle pilot signal and will amplify said second harmonic so that the dominating frequency appearing on the output of collector electrode 70 will be a 38 kilocycle signal, which is then supplied through coupling capacitor 74 to the base of amplifying transistor 75. In the collector electrode circuit of transistor 75 is another tuned circuit 72, also tuned to a frequency of 38 kilocycles. The output signal appearing on the collector electrode of transistor 75 is supplied through the coupling capacitor 79 and resistor 81 to the diodes 15′ and 16′. Also, said output signal is supplied back to the base of transistor 70 through resistor 78 to provide positive feedback, thus enhancing the gain of the 38 kilocycle second harmonic signal. Resistor 77 functions to prevent overloading of the transistor 75 and capacitor 76 provides an R–F bypass. Resistors 73 and 77 form a voltage divider network from the negative battery 23′ to ground potential through the base-emitter electrode gap of transistor 75, thus determining the potential bias of the base of transistor 75. Since the battery source 23′ is negative with respect to ground, the transistor 75 will always be conductive to some degree.

The 38 kilocycle signal, in the manner discussed above, is supplied from the collector of transistor 75 to the diodes 15′ and 16′ to create the waveforms of FIGS. 4 and 5 from which the original left and right audio signals are reproduced.

Filters 19′ and 20′ are standard type filters. For example, filter 19′ comprises a pi network consisting of capacitors 62 and 63, and resistor 61, and functions to remove the 38 kilocycle component from the output signal supplied to the output terminal 21, leaving only the combined lower envelopes.

Similarly, filter 20′, consisting of capacitors 64 and 65 and resistor 66, functions to remove the 38 kilocycle component from the signals supplied thereto, leaving only the combined upper envelopes to be supplied to the output terminal 22′.

It is to be understood that the forms of the invention shown and described herein are but preferred embodiments thereof and that various arrangements may be made in the circuit arrangement without departing from the spirit or scope of the invention.

I claim:

1. Receiver means automatically adaptable to receive a monaural signal or a stereophonic signal including an $(R+L)$ Audio signal, a double sideband signal with a suppressed carrier signal containing an $(R-L)$ audio signal, and a pilot signal;

said receiver means comprising:

receiving means for initially receiving the transmitted monaural or stereophonic signal, said receiving means having a pair of output terminals;

first channel output means comprising the series arrangement of first diode means and first impedance means connected across the output terminals of said receiving means;

second channel output means comprising the series arrangement of second diode means and second impedance means connected across said output terminals;

said first and second diode means being oppositely poled with respect to said output terminals and each having one terminal thereof connected to a common terminal of said output terminals;

D.-C. biasing means for biasing one of said diodes into nonconductivity when a monaural signal is being received;

tuned amplifier means responsive to said pilot signal when a stereo signal is being received to produce a resultant signal whose frequency is substantially equal to the frequency of said suppressed carrier, said resultant signal having an amplitude which is large compared to the amplitude of said D.-C. biasing voltage;

means for supplying said resultant signal to said common terminal, and means for extracting the combined envelopes of the signals passing through each of said diode means.

2. Receiver means in accordance with claim 1 in which the said pilot signal has a frequency equal to one-half the frequency of said suppressed carrier signal, and in which said tuned amplifier means is constructed to respond to said pilot signal to produce a resultant signal whose frequency is double that of said pilot signal.

3. Receiver means for receiving a monaural signal or a stereophonic signal including an $(R+L)$ audio signal, a double sideband signal with a suppressed carrier signal containing an $(R-L)$ audio signal, and a pilot signal.

said receiver means comprising:

receiving means for initially receiving and detecting a transmitted signal, said receiver means having a pair of output terminals;

first and second detecting means, respectively, comprising:

first and second diode means, each having one terminal thereof connected to a given one of said output terminals and in parallel with each other with respect to said output terminals, and oppositely poled with respect to said output terminals, D.-C. biasing means for biasing one of said diodes into nonconductivity when a monaural signal is being received;

circuit means responsive to said pilot signal when a stereo signal is being received to produce a resultant signal whose frequency is equal to the frequency of said suppressed carrier signal and whose peak amplitude is greater than the sum of the D.-C. biasing voltage and the peak amplitude of the $(R+L)$ audio signal;

means for supplying said resultant signal to said first and second diode means to combine with the signals from said receiving means and to produce a multiplexing action in said diode means;

and means for removing said resultant signal component from the output signals of said diode means.

4. Receiver means in accordance with claim 3 in which the frequency of said pilot signal is equal to one-half the frequency of said suppressed carrier signal and in which said circuit means responsive to said pilot signal is constructed to produce a resultant signal whose frequency is double that of said pilot signal.

References Cited by the Examiner

UNITED STATES PATENTS

| | | | |
|---|---|---|---|
| 3,070,662 | 12/62 | Eilers | 179—15 |
| 3,109,896 | 11/63 | Boothroyd | 179—15 |

OTHER REFERENCES

Snitzer: "Stereo FM Multiplex Adapter Circuits," Electronics World, (Page 40 relied on).

IRE Transactions On Broadcast and Television Receivers, November 1961, pages 40–44.

DAVID G. REDINBAUGH, *Primary Examiner.*

STEPHEN W. CAPELLI, *Examiner.*